United States Patent
Gummididala et al.

(10) Patent No.: US 10,382,428 B2
(45) Date of Patent: Aug. 13, 2019

(54) SYSTEMS AND METHODS FOR PROVIDING SINGLE SIGN-ON AUTHENTICATION SERVICES

(71) Applicant: Mastercard International Incorporated, Purchase, NY (US)

(72) Inventors: Srinivas M Gummididala, Hyderabad (IN); Vikram Pappula, Hyderabad (IN); Arvind Jangi, Chesterfield, MS (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 188 days.

(21) Appl. No.: 15/271,438

(22) Filed: Sep. 21, 2016

(65) Prior Publication Data

US 2018/0083952 A1    Mar. 22, 2018

(51) Int. Cl.
*H04L 29/06* (2006.01)
*H04L 9/32* (2006.01)

(52) U.S. Cl.
CPC .......... *H04L 63/0815* (2013.01); *H04L 9/321* (2013.01); *H04L 63/0428* (2013.01);
(Continued)

(58) Field of Classification Search
CPC ..... H04L 63/0815; H04L 63/06; H04L 63/08; H04L 63/0807; H04L 63/0823; H04L 63/083; H04L 63/0838; H04L 63/0846; H04L 63/0853; H04L 63/0861; H04L 63/0869; H04L 63/0876; H04L 63/0884; H04L 63/0892; H04L 9/0863; H04L 9/14; H04L 9/3226; H04L 9/32; H04L 9/3202; H04L 9/3205; H04L 9/3207; H04L 9/321; H04L 9/3213; H04L 9/3215; H04L 9/3218; H04L 9/3221; H04L 9/3223; H04L 9/3228; H04L 9/3231; H04L 9/3234; H04L 9/3236; H04L 9/3239; H04L 9/3242; H04L 9/3244; H04L 9/3247; H04L 9/3249; H04L 9/3252; H04L 9/3255; H04L 9/3257; H04L 9/326; H04L 9/3263; H04L 9/3265; H04L 9/3268; H04L 9/3271; H04L 9/3273
(Continued)

(56) References Cited

U.S. PATENT DOCUMENTS 6,769,068 B1 * 7/2004 Brozowski ............. H04L 63/08
                                                        726/1
6,801,946 B1 * 10/2004 Child ................ H04L 29/12132
                                                        709/219
(Continued)

*Primary Examiner* — Shahriar Zarrineh

(57) ABSTRACT

Embodiments of the disclosure enable a system to provide authentication services. The system includes a system server that receives data associated with an application service, uses a first key associated with a device identifier corresponding to a user device to decrypt the data associated with the application service, uses a second key associated with a password stored at the system server to encrypt the data associated with the application service, and transmits, to an application server, the data associated with the application service such that the application server is configured to provide the application service for a user associated with the user device. Aspects of the disclosure provide for transmitting sensitive data in a secure and user-friendly manner.

20 Claims, 8 Drawing Sheets

(52) U.S. Cl.
CPC ............ *H04L 63/06* (2013.01); *H04L 63/083* (2013.01); *H04L 2209/56* (2013.01); *H04L 2209/805* (2013.01)

(58) Field of Classification Search
USPC .......................................................... 713/168
See application file for complete search history.

(56) References Cited

U.S. PATENT DOCUMENTS

| | | | |
|---|---|---|---|
| 6,892,307 B1 | 5/2005 | Wood et al. | |
| 6,957,337 B1* | 10/2005 | Chainer | G06F 21/32 713/186 |
| 7,296,290 B2 | 11/2007 | Barriga et al. | |
| 7,540,020 B1* | 5/2009 | Biswas | H04L 63/0815 726/6 |
| 7,540,022 B2 | 5/2009 | Barari et al. | |
| 7,788,700 B1* | 8/2010 | Feezel | G06F 21/31 713/163 |
| 8,214,652 B2* | 7/2012 | LaCous | G06F 21/32 340/5.53 |
| 8,484,711 B1* | 7/2013 | Coletta | H04L 63/00 705/35 |
| 8,601,498 B2* | 12/2013 | Laurich | G06F 21/602 719/326 |
| 8,713,658 B1* | 4/2014 | Tidd | H04L 63/0815 713/155 |
| 8,719,568 B1* | 5/2014 | Antypas, III | H04L 9/14 713/168 |
| 8,769,651 B2 | 7/2014 | Grajek et al. | |
| 9,094,206 B2* | 7/2015 | Di Crescenzo | H04L 63/0869 |
| 9,123,033 B2* | 9/2015 | Phillips | G06Q 20/0453 |
| 9,801,053 B1* | 10/2017 | Ziraknejad | H04W 12/04 |
| 2002/0046286 A1* | 4/2002 | Caldwell | H04L 29/06 709/229 |
| 2002/0122553 A1* | 9/2002 | Kao | H04L 9/0891 380/28 |
| 2003/0147536 A1* | 8/2003 | Andivahis | H04L 63/06 380/277 |
| 2003/0226036 A1* | 12/2003 | Bivens | H04L 63/0815 726/8 |
| 2004/0193918 A1* | 9/2004 | Green | H04L 63/1433 726/22 |
| 2005/0027584 A1* | 2/2005 | Fusari | H04L 29/12009 709/203 |
| 2005/0138362 A1* | 6/2005 | Kelly | H04L 63/0807 713/156 |
| 2005/0273843 A1* | 12/2005 | Shigeeda | H04L 9/3213 726/5 |
| 2006/0143453 A1* | 6/2006 | Imamoto | H04L 9/3273 713/169 |
| 2006/0195893 A1 | 8/2006 | Caceres et al. | |
| 2006/0274899 A1* | 12/2006 | Zhu | H04L 9/083 380/281 |
| 2006/0294196 A1* | 12/2006 | Feirouz | G06F 17/30899 709/217 |
| 2008/0263629 A1* | 10/2008 | Anderson | H04L 9/0894 726/2 |
| 2009/0063853 A1* | 3/2009 | Kassai | H04L 9/0844 713/156 |
| 2009/0165102 A1* | 6/2009 | Zagni | G06F 21/31 726/6 |
| 2010/0222044 A1* | 9/2010 | Baccay | H04M 3/42042 455/415 |
| 2010/0290623 A1* | 11/2010 | Banks | G06F 21/6227 380/277 |
| 2011/0277027 A1* | 11/2011 | Hayton | H04L 63/0815 726/8 |
| 2012/0166818 A1* | 6/2012 | Orsini | H04L 9/085 713/193 |
| 2012/0233675 A1* | 9/2012 | Hird | H04L 63/0838 726/6 |
| 2012/0278872 A1* | 11/2012 | Woelfel | H04L 61/2596 726/7 |
| 2013/0097429 A1* | 4/2013 | Grandcolas | H04L 9/0825 713/185 |
| 2013/0124292 A1* | 5/2013 | Juthani | G06F 21/41 705/14.26 |
| 2013/0198828 A1* | 8/2013 | Pendergrass | G06F 21/33 726/10 |
| 2013/0312073 A1* | 11/2013 | Srivastav | H04L 9/3215 726/7 |
| 2014/0230307 A1* | 8/2014 | Bartholomew | A01M 31/06 43/2 |
| 2014/0258132 A1* | 9/2014 | Swamy | G06K 7/0004 705/67 |
| 2014/0317408 A1* | 10/2014 | Runcie | H04L 9/0819 713/171 |
| 2014/0380048 A1* | 12/2014 | He | H04L 63/083 713/168 |
| 2015/0088934 A1* | 3/2015 | Beckman | G06F 21/6227 707/781 |
| 2015/0095999 A1* | 4/2015 | Toth | H04L 63/08 726/6 |
| 2015/0286816 A1* | 10/2015 | Adler | G06F 21/45 726/6 |
| 2015/0350418 A1* | 12/2015 | Rauenbuehler | H04L 63/0823 455/414.1 |
| 2016/0006697 A1* | 1/2016 | Joglekar | H04L 63/20 713/152 |
| 2016/0285858 A1* | 9/2016 | Li | H04L 63/0815 |
| 2016/0373414 A1* | 12/2016 | MacCarthaigh | H04L 63/0435 |
| 2016/0373436 A1* | 12/2016 | Kapoor | H04L 63/0846 |
| 2017/0116424 A1* | 4/2017 | Aamir | G06F 21/606 |
| 2017/0230355 A1* | 8/2017 | Su | H04L 63/0823 |
| 2017/0244555 A1* | 8/2017 | Beiter | H04L 9/0819 |
| 2017/0366344 A1* | 12/2017 | Berzin | H04L 9/0847 |
| 2018/0046949 A1* | 2/2018 | Kahn | G06Q 30/04 |
| 2018/0048464 A1* | 2/2018 | Lim | H04L 9/08 |
| 2018/0083955 A1* | 3/2018 | Tuli | G06F 21/32 |

\* cited by examiner

US 10,382,428 B2

SYSTEMS AND METHODS FOR PROVIDING SINGLE SIGN-ON AUTHENTICATION SERVICES

FIELD OF THE DISCLOSURE

The subject matter described herein relates generally to authentication services and, more specifically, to systems and methods for providing single sign-on authentication services for a plurality of applications.

BACKGROUND

Known computing systems, such as mobile devices, may include one or more applications that allow the computing systems to communicate directly with one or more remote computing systems, such as application servers. Some known applications may prompt a user of a mobile device, for example, to provide login credentials (e.g., username, password) for authenticating the user. Upon authenticating the user, at least some known applications may determine whether the user is allowed to access or use the application.

To manage a plurality of login credentials, at least some known mobile devices may utilize a digital wallet that allows the user to store the login credentials and retrieve the login credentials as needed. The login credentials may be stored, for example, locally at the mobile device or remotely at a remote computing system, such as a cloud storage server. In either case, the digital wallet may be utilized to retrieve one or more login credentials and enable the mobile device to transmit the retrieved login credentials directly to one or more application servers for accessing or using one or more applications.

SUMMARY

Embodiments of the disclosure enable a system to provide single sign-on services. The system includes one or more application servers configured to provide one or more application services, and a system server coupled to the one or more application servers. The one or more application servers include a first application server configured to provide a first application service. The system server is configured to receive data associated with the first application service, use a first key associated with a device identifier corresponding to the user device to decrypt the data associated with the first application service, use a second key associated with a first password stored at the system server to encrypt the data associated with the first application service, and transmit, to the first application server, the data associated with the first application service such that the first application server is configured to provide the first application service for a user associated with the user device.

In another aspect, one or more computer storage media embodied with instructions executable by one or more processors are provided for providing single sign-on services. The one or more computer storage media include a client component that obtains first encrypted data associated with an application service, an encryption component that generates a first key based on a device identifier corresponding to the user device, uses the first key to decrypt the first encrypted data, generates a second key based on a password associated with an application server, and uses the second key to generate second encrypted data associated with the application service, and an application component that identifies the application server associated with the application service and transmits the second encrypted data to the application server such that the application server is configured to provide the application service for a user associated with the user device.

In yet another aspect, a computer-implemented method is provided for providing single sign-on services. The computer-implemented method includes receiving data associated with an application service, decrypting the data associated with the application service using a first key associated with a device identifier that corresponds to the user device, encrypting the data associated with the application service using a second key associated with a password stored at the system server, and transmitting, to an application server associated with the application service, the data associated with the application service such that the application server is configured to provide the application service for a user associated with the user device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
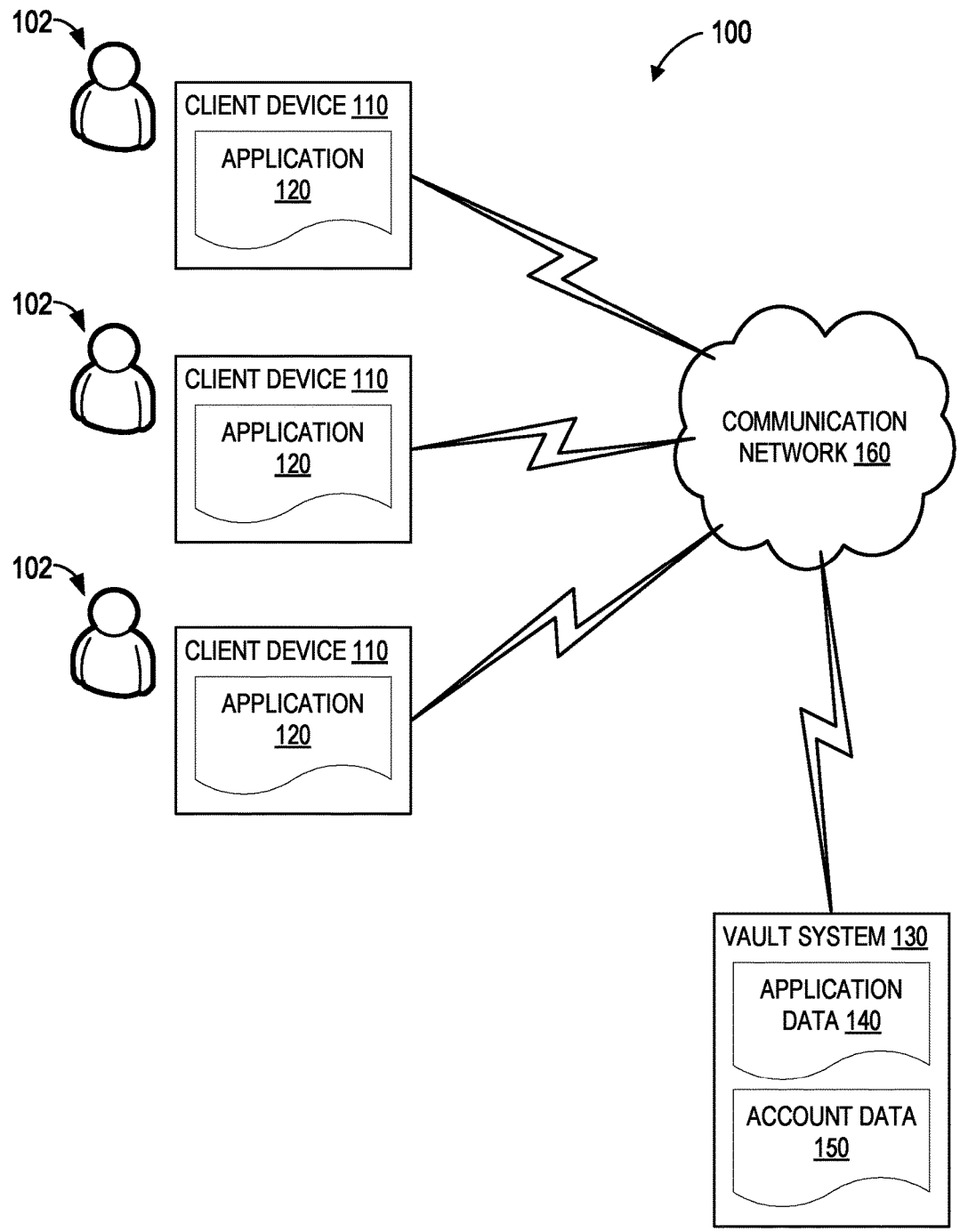
FIG. 1 is a block diagram illustrating an example environment for providing authentication services.

The subject matter described herein relates to a system server that may be used to provide single sign-on authentication services. Embodiments of the disclosure enable sensitive data to be transmitted and used in a secure and user-friendly manner. For example, a system server may receive encrypted data from a client device, and decrypt the received data using a first key associated with a device identifier corresponding to the client device. Additionally or alternatively, the system server may encrypt data using a second key associated with a password for accessing or using an application server, and transmit the encrypted data to the application server.

Aspects of the disclosure provide for a computing device that processes one or more transactions in an environment including a plurality of devices coupled to each other via a network (e.g., a local area network (LAN), a wide area network (WAN), the Internet). For example, a system server may allow one or more other computing systems (e.g., a client device, an application server) to communicate with each other via the system server. The system server may be configured to communicate with one or more registered client devices (e.g., a client device that has a device identifier registered with the system server). In this manner, the system server may be configured to not communicate with a client device that does not have a device identifier registered with the system server. Additionally or alternatively, the system server may be used to store one or more passwords for accessing or using one or more application servers. In this manner, the system server may be configured to negotiate one or more secure sessions with one or more application servers upon authenticating a registered client device and identifying one or more passwords associated with the registered client device.

The systems and processes described herein may be implemented using computer programming or engineering techniques including computer software, firmware, hardware or a combination or subset thereof. At least one technical problem with known authentication systems is that data transmitted to and/or from the authentication system may be intercepted and/or compromised. The embodiments described herein address at least this technical problem.

By providing authentication services in the manner described in this disclosure, some embodiments improve data integrity, data transmission security, communication between systems, user experience, and/or user interaction performance by using a central computing system to control communications between a client device and an application server. For example, a system server may be configured to communicate solely with registered client devices and application servers associated with preapproved applications. Additionally or alternatively, communications transmitted to and/or from the system server may be encrypted using a device identifier corresponding to the user device and/or a password associated with accessing or using the application server. In this manner, the embodiments described herein may facilitate increasing an integrity of an authentication system and a confidence in data transmitted to and/or from the authentication system. Additionally, some embodiments may reduce processor load by reducing an amount of data to be analyzed or processed, reduce network bandwidth usage and/or improve communication between systems by reducing an amount of data to be transmitted, improve processor security by managing access to various systems, and/or reduce error rate by automating the analysis and processing of authentication requests. In some embodiments, the subject matter described herein may facilitate increasing processor speed and/or improving operating system resource allocation.

The technical effect of the systems and processes described herein is achieved by performing at least one of the following operations: a) receive a request to register a user device, b) map a device identifier to the user device; c) map one or more passwords to one or more application servers; d) determine whether a key threshold is satisfied; e) generate a first key, a first corresponding key, a second key, and/or a second corresponding key; f) transmit a first corresponding key for encrypting the data; g) generate a key generator configured to generate a key pair including the first key or the second key, h) transmit the key generator, i) receive a request to access an application server, j) determine whether the user device is authorized to access the application server, k) receive data encrypted at the user device, l) analyze the encrypted data to identify the user device, a password, and/or an application server, m) identify the first key for decrypting the encrypted data, n) use the first key to decrypt the encrypted data, o) use the password to generate the second key, p) use the second key to encrypt the data, and/or q) transmit the encrypted data.

FIG. 1 is a block diagram illustrating an example environment 100 that allows one or more services to be provided for one or more users 102. In some embodiments, the environment 100 includes one or more user devices or client devices 110. A client device 110 may include, store, or have access to one or more applications 120 ("apps") that enable the client device 110 to provide one or more application services ("app services") for a user 102 of the client device 110.

The client device 110 may include an operating system that enables the applications 120 to provide the application services in a user-friendly manner. For example, the operating system may include one or more application program interfaces (APIs) that enable the client device 110 to present data to and/or obtain user input from the user 102 (e.g., via a graphical user interface), and/or to transmit data to and/or receive data from one or more other computing systems (e.g., via a network interface). In some embodiments, the client device 110 communicates with a vault system 130 (e.g., via the network interface) to transmit application data 140 (e.g., "app data") associated with the applications 102 between the client device 110 and the vault system 130.

Application data 140 may be utilized to provide an application service for the user 102. For example, the client device 110 may present the application data 140 (e.g., via the graphical user interface) to the user 102. Application data 140 may be generated, stored, and/or maintained at one or more computing systems, including the client device 110 and/or the vault system 130. For example, at least some application data 140 may be generated, stored, and/or maintained locally at the client device 110, and/or at least some application data 140 may be generated, stored, and/or maintained remote from the client device 110 (e.g., at the vault system 130).

In some embodiments, the vault system 130 includes, stores, or has access to account data 150 associated with the users 102. Account data 150 may be utilized to authenticate a client device 110 or a user 102 associated with the client device 110, and determine whether the client device 110 and/or the user 102 is authorized to access or use the vault system 130. For example, the vault system 130 may utilize the account data 150 to provide single sign-on authentication services for a user 102. In some embodiments, account data 150 may allow a user 102 to enter into one or more financial transactions. For example, the client device 110 may communicate with the vault system 130 to obtain account data 150 (e.g., cardholder account data) from the vault system 130, and utilize the account data 150 to generate a request for authorization of a financial transaction.

The environment 100 includes one or more communication networks 160 that enable data to be transferred between a plurality of computing systems (e.g., client device 110, vault system 130) coupled to the communication network 160. As used herein, a computing system may be understood to mean a single computing device or a plurality of interconnected computing devices that operate together to perform a particular function. That is, each computing system may be contained within a single hardware unit or be distributed among several or many different hardware units, including in a cloud-computing environment. Example communication networks 160 include a cellular or mobile network and the Internet. Alternatively, the communication network 160 may be any communication medium that enables the environment 100 to function as described herein including, for example, a personal area network (PAN), a local area network (LAN), and/or a wide area network (WAN).

Figure 2:
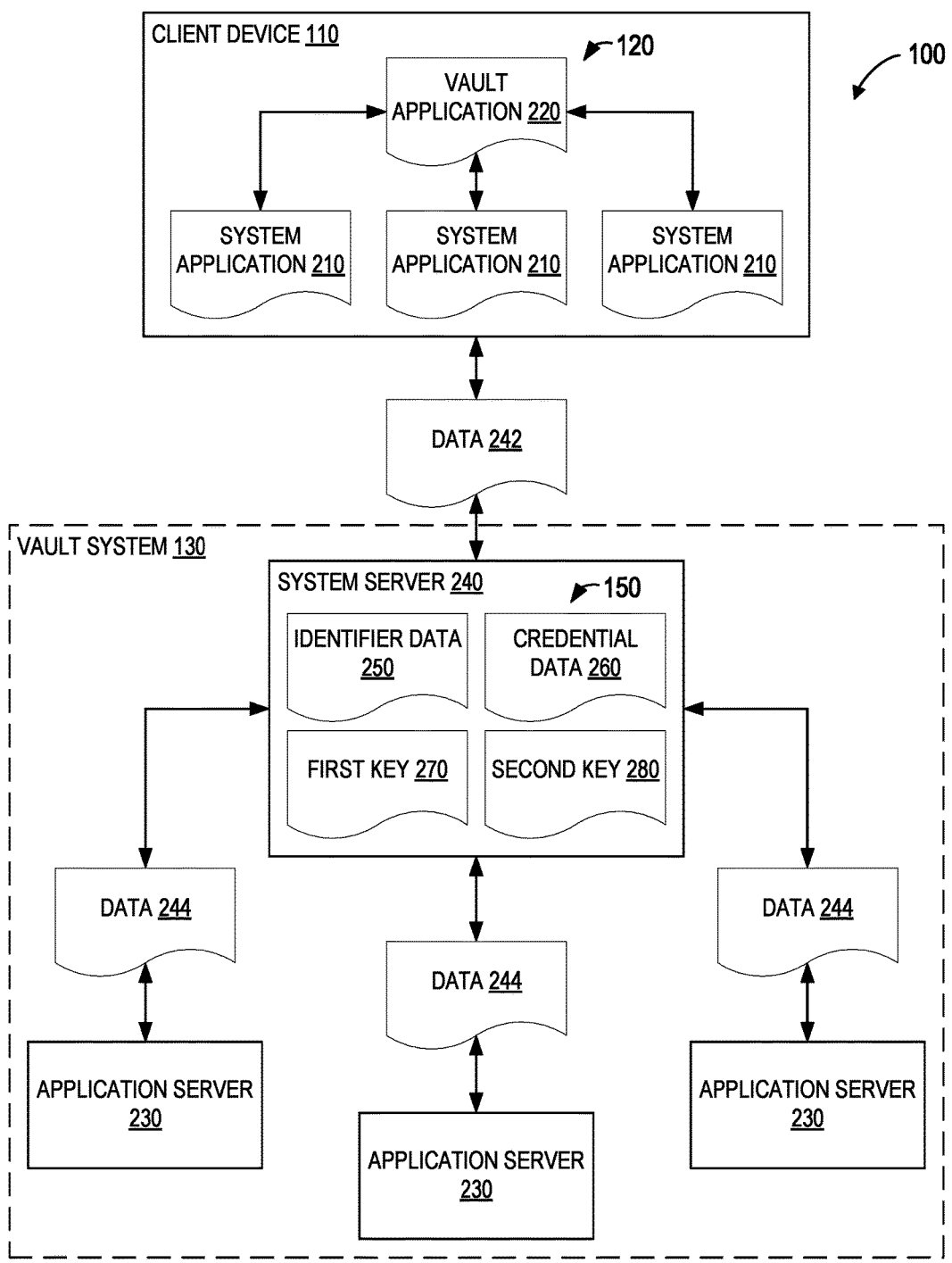
FIG. 2 is a block diagram illustrating an environment, such as the environment shown in FIG. 1, including an example system server and a plurality of example application servers.

FIG. 2 is a detailed block diagram illustrating the environment 100. In some embodiments, the client device 110 includes one or more system applications 210 ("system apps") that may be utilized to provide one or more application services, and a vault application 220 ("vault app") that may be utilized to communicatively couple the client device 110 to the vault system 130. The vault application 220 may support, for example, single sign-on authentication for the system applications 210. The system applications 210 may be preapproved or registered based on a desired application service associated with the system application 210 and/or an integrity or security of an application server 230 ("app server") associated with the system application 210. The vault system 130 includes one or more application servers 230 associated with the system applications 210, and a policy server or system server 240 configured to control communication (e.g., data transmission) in the environment 100. For example, the system server 240 may control data 242 transmitted between the system server 240 and a client device 110, and/or data 244 transmitted between the system server 240 and an application server 230.

In some embodiments, data 242 is associated with data 244. For example, data received at the system server 240 from a client device 110 or an application server 230 may be forwarded on to the application server 230 or the client device 110, respectively. For another example, data received at the system server 240 from a client device 110 or an application server 230 may be copied, and a copy of the data may be transmitted to the application server 230 or the client device 110, respectively. For yet another example, data received at the system server 240 from a client device 110 or an application server 230 may be processed to generate new data, and the new data may be transmitted to the application server 230 or the client device 110, respectively. It should be understood, however, that, in at least some embodiments, data 242 is not associated with data 244. For example, some data may be transmitted solely between a system server 240 and a client device 110 or solely between the system server 240 and an application server 230, but not both. That is, in some embodiments, at least some data received at the system server 240 may not be transmitted to the client device 110 or to the application server 230.

To facilitate increasing data transmission security in the environment 100, data 242 and/or data 244 may be encrypted at a source of the data (e.g., the sender) and/or decrypted at a destination of the data (e.g., the receiver) using one or more key pairs. For example, one key of a key pair may be used to encrypt data at the source, and the other key of the key pair may be used to decrypt data at the destination. In some embodiments, one or more key pairs are generated using account data 150, such as identifier data 250 associated with a client device 110 and/or credential data 260 associated with the system server 240 or with an application server 230. Identifier data 250 may uniquely identify a client device 110. Identifier data 250 may include, for example, a device identifier, an equipment identifier, a serial number, a media access controller (MAC) address, and the like. Credential data 260 may be utilized to grant access to the vault system 130. Credential data 260 may include, for example, a username, a handle, an identification number, an employee number, a password, a personal identification number (PIN), biometric data, and the like.

In some embodiments, a first key pair used to encrypt and decrypt data 242 is different from a second key pair used to encrypt and decrypt data 244. For example, the first key pair may include a first key 270 stored at the system server 240, and a first corresponding key stored at the client device 110, and the second key pair may include a second key 280 stored at the system server 240 and a second corresponding key stored at the application server 230. In this manner, the encryption used between the client device 110 and the system server 240 may be different from the encryption used between the application server 230 and the system server 240. In some embodiments, the first key pair is generated based on identifier data 250, and/or the second key pair is generated based on credential data 260. As used herein, a key may be understood to mean a single key configured to encrypt and decrypt data or a plurality of keys including an encrypting key configured to encrypt data and a decrypting key configured to decrypt data.

Figure 3:
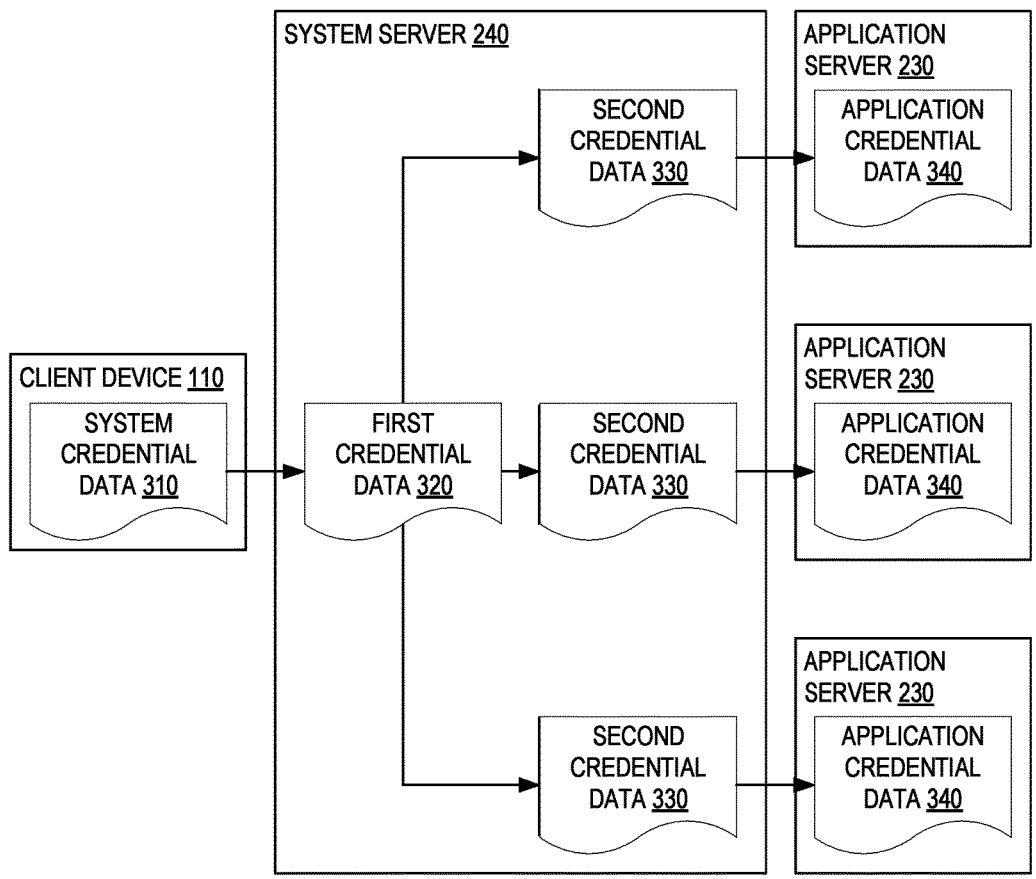
FIG. 3 is a block diagram illustrating an example map that may be used to provide authentication services.

FIG. 3 is a detailed block diagram illustrating a map 300 for using credential data 260 to provide authentication services in the environment 100. Credential data 260 may include, for example, system credential data 310 and first credential data 320 associated with accessing or using the system server 240 and/or second credential data 330 and application credential data 340 associated with accessing or using the application servers 230. First credential data 320 and/or second credential data 330 may be obtained and stored at the system server 240, for example, during a registration process. Additionally or alternatively, application credential data 340 may be obtained and stored at the application server 230, for example, during a registration process.

In some embodiments, a client device 110 utilizes a vault application 220 to monitor one or more system applications 210 for an access or use of a system application 210 (e.g., a first application). A selection of an icon associated with a system application 210, for example, may indicate that the system application 210 is being accessed. Upon identifying that a system application 210 is being accessed or used, the vault application 220 may be utilized to prompt a user 102 of the client device 110 to provide user input for accessing the vault system 130 (e.g., vault login credentials). A request to access the vault system 130, including system credential data 310 associated with the client device 110 (e.g., a device identifier) and/or with the user input (e.g., the vault login credentials), is generated at the client device 110 and transmitted (e.g., as data 242) to the system server 240.

The system server 240 is configured to receive the system credential data 310, and compare the received system credential data 310 with first credential data 320 stored at the system server 240 to determine whether the client device 110 and/or the user 102 of the client device 110 is authorized to access or use the system server 240. First credential data 320 may be utilized to generate and maintain a relational directory that maps one or more registered client devices 110 to one or more users 102 authorized to use the registered client devices 110. For example, one or more device identifiers associated with one or more client devices 110 may be mapped to one or more vault login credentials. If the received system credential data 310 does not correspond to the first credential data 320, the system server 240 determines that the client device 110 and/or the user 102 of the client device 110 is not authorized to access or use the system server 240. On the other hand, if the received system credential data 310 corresponds to the first credential data 320, the system server 240 determines that the client device 110 and the user 102 of the client device 110 are authorized to access or use the system server 240.

In some embodiments, the system server 240 identifies second credential data 330 associated with the first credential data 320, and transmits the second credential data 330 (e.g., as data 244) to one or more application servers 230 associated with the identified second credential data 330. First credential data 320 may be mapped to second credential data 330, and second credential data 330 may be utilized to generate and maintain a relational directory that maps the second credential data 330 to one or more application servers 230. For example, the system server 240 may identify one or more system applications 210 associated with a client device 110, and prompt a user 102 of the client device 110 to provide one or more passwords associated with the identified system applications 210.

Each application server 230 is configured to receive a respective second credential data 330, and compare the received second credential data 330 with application credential data 340 stored at the application server 230 to determine whether the client device 110 is authorized to access or use the application server 230 (e.g., via the system server 240). If the received second credential data 330 does not correspond to the application credential data 340, the application server 230 determines that the client device 110 is not authorized to access or use the application server 230. On the other hand, if the received second credential data 330 corresponds to the application credential data 340, the application server 230 determines that the client device 110 is authorized to access or use the application server 230 (e.g., via the system server 240). In this manner, the system server 240 may selectively allow data 244 to be transmitted between a client device 110 and one or more application servers 230.

Figure 4:
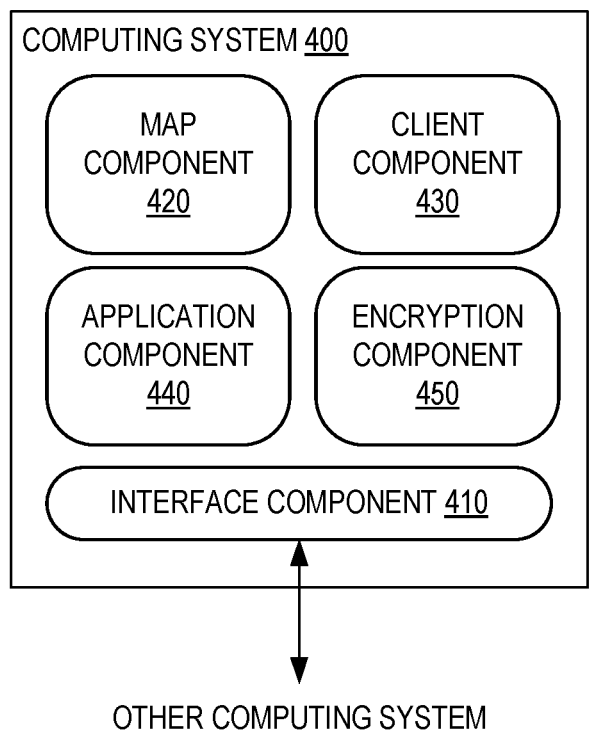
FIG. 4 is a block diagram illustrating a plurality of example components that may be used to provide authentication services.

FIG. 4 is a block diagram illustrating a computing system 400 (e.g., system server 240) that may be used to provide authentication services. The computing system 400 includes an interface component 410, a map component 420, a client component 430, an application component 440, and/or an encryption component 450.

The interface component 410 enables the system server 240, for example, to receive data from and/or transmit data to one or more other computing devices (e.g., client device 110, application server 230). For example, the interface component 410 may be coupled to the map component 420, client component 430, application component 440, and/or encryption component 450 to facilitate communication between another computing device and the map component 420, client component 430, application component 440, and/or encryption component 450. In some embodiments, the interface component 410 facilitates communication between the map component 420, client component 430, application component 440, and/or encryption component 450.

The map component 420 enables the computing system 400 to manage account data 150, including identifier data 250, credential data 260 (e.g., first credential data 320, second credential data 330), and/or encryption data (e.g., first key 270, second key 280). Each client device 110 and/or each user 102 associated with a client device 110 may be associated with a respective account data 150. In some embodiments, the map component 420 processes one or more requests to register a client device 110 and/or a user 102 of the client device 110. A request may be obtained, for example, via the interface component 410. The map component 420 enables the computing system 400 to organize and/or store account data 150 such that the interface component 410, map component 420, client component 430, application component 440, and/or encryption component 450 are configured to access or use the account data 150 in an efficient manner. For example, identifier data 250 (e.g., a device identifier), a first key 270, and/or first credential data 320 may be mapped to a client device 110, and/or a second key 280 and/or second credential data 330 (e.g., a password) may be mapped to an application server 230.

In some embodiments, the map component 420 processes one or more requests to register an application server 230 with the vault system 130. A request may be obtained, for example, via the interface component 410. The map component 420 enables the computing system 400 to organize and/or store application data 140 such that the interface component 410, map component 420, client component 430, application component 440, and/or encryption component 450 are configured to access or use the application data 140 in an efficient manner. For example, application data 150 may be mapped to an application service, a system application 210, and/or an application server 230.

The client component 430 enables the computing system 400 to manage communications with a client device 110. For example, the client component 430 may process and/or direct data received from and/or transmitted to the client device 110 (e.g., data 242). In some embodiments, the client component 430 processes data 242 to authenticate the client device 110 and establish a secure session with the client device 110 such that data 242 may be securely transmitted between the client device 110 and the computing system 400 (e.g., via the interface component 410). The client component 430 is configured to analyze data 242 to identify one or more system applications 210 and/or one or more application services associated with the system applications 210, and communicate with the application component 440 to provide the application services.

The application component 440 enables the computing system 400 to manage communications with one or more application servers 230. For example, the application component 440 may process and/or direct data transmitted to and/or received from an application server 230 (e.g., data 244). In some embodiments, the application component 440 communicates with the client component 430 to identify one or more application services and/or one or more application servers 230 associated with the application services and establish one or more secure sessions with the application servers 230 to the computing system 400 such that data 244 may be transmitted between the application servers 230 and the computing system 400 (e.g., via the interface component 410).

The encryption component 450 enables the computing system 400 to securely communicate with a client device 110 and/or with one or more application servers 230. For example, the encryption component 450 may use a first key 270 to encrypt or decrypt data 242, and a second key 280 to encrypt or decrypt data 244. The first key 270 may include or be associated with identifier data 250 (e.g., a device identifier of a client device 110), and/or the second key 280 may be associated with credential data 260 (e.g., a password for accessing an application server 230).

In some embodiments, the encryption component 450 includes one or more key generators configured to generate one or more keys. For example, a first key generator may be used to generate the first key 270 and/or a first corresponding key at the computing system 400, and/or a second key generator may be used to generate the second key 280 and/or a second corresponding key at the computing system 400. Alternatively, the first key 270, first corresponding key, second key 280, and/or second corresponding key may be generated at an other computing system (e.g., client device 110, application server 230) and received from the other computing system. In some embodiments, the encryption component 450 transmits the first corresponding key to the client device 110 and/or the second corresponding key to the application server 230 (e.g., via the interface component 410). Additionally or alternatively, one or more key generators may be transmitted to the client device 110 and/or an application server 230 to enable the client device 110 and/or the application server 230 to generate one or more keys.

In some embodiments, one or more key generators are transmitted to the client device 110 and/or an application server 230 to enable the client device 110 and/or the application server 230 to generate one or more keys.

In some embodiments, the encryption component 450 generates the first key pair and/or the second key pair based on one or more key thresholds. For example, the encryption component 450 may determine whether a first key threshold is satisfied and generate the first key 270 if the first key threshold is satisfied, and/or determine whether a second key threshold is satisfied and generate the second key 280 if the second key threshold is satisfied. Use of the key thresholds allow the keys to be systematically updated (e.g., updated with each secure session) and/or periodically updated (e.g., updated based on a time period).

Figure 5:
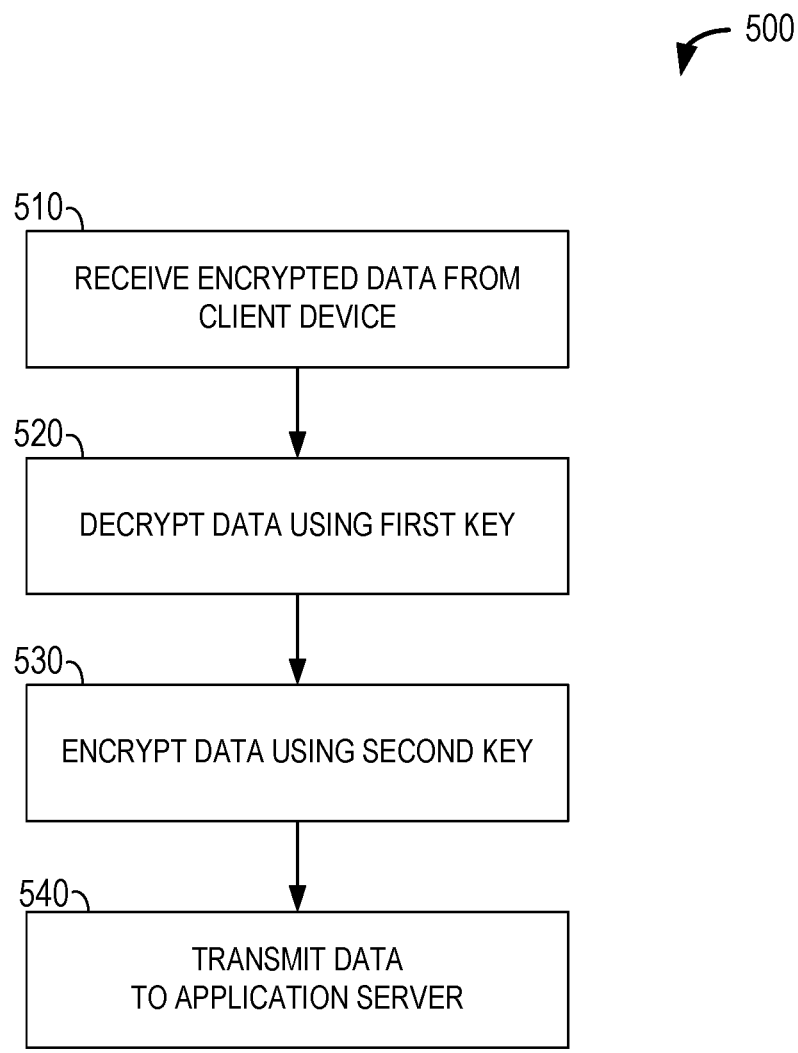
FIG. 5 is a flowchart of an example method for providing authentication services at a system server, such as the system server shown in FIG. 2.

FIG. 5 is a flowchart of an example method 500 for providing authentication services at a system server 240. In some embodiments, the system server 240 receives data associated with an application service (e.g., data 242) at 510. The data 242 may be encrypted, for example, at a client device 110 using a key associated with identifier data 250 (e.g., a first corresponding key generated based on a device identifier corresponding to the client device 110) to generate first encrypted data. In some embodiments, the system server 240 decrypts the first encrypted data using another key associated with identifier data 250 (e.g., a first key 270 generated based on the device identifier) at 520, For example, the system server 240 may analyze the first encrypted data to identify the client device 110 and, based on the identification of the client device 110, identify the first key 270.

The first encrypted data may be analyzed to identify an application server 230 associated with the application service and, based on the application server 230, identify a password associated with the identified application server 230. In some embodiments, the system server 240 encrypts the data using a key associated with credential data 260 (e.g., a second key 280 generated based on the password associated with the application server 230) at 530 to generate second encrypted data, and transmits the second encrypted data (e.g., data 244) to the application server 230 at 540. In this manner, data (e.g., data 242, data 244) may be transmitted between the client device 110 and the application server 230 such that the application service may be provided for a user 102 of the client device 110 in a secure manner.

Figure 6:
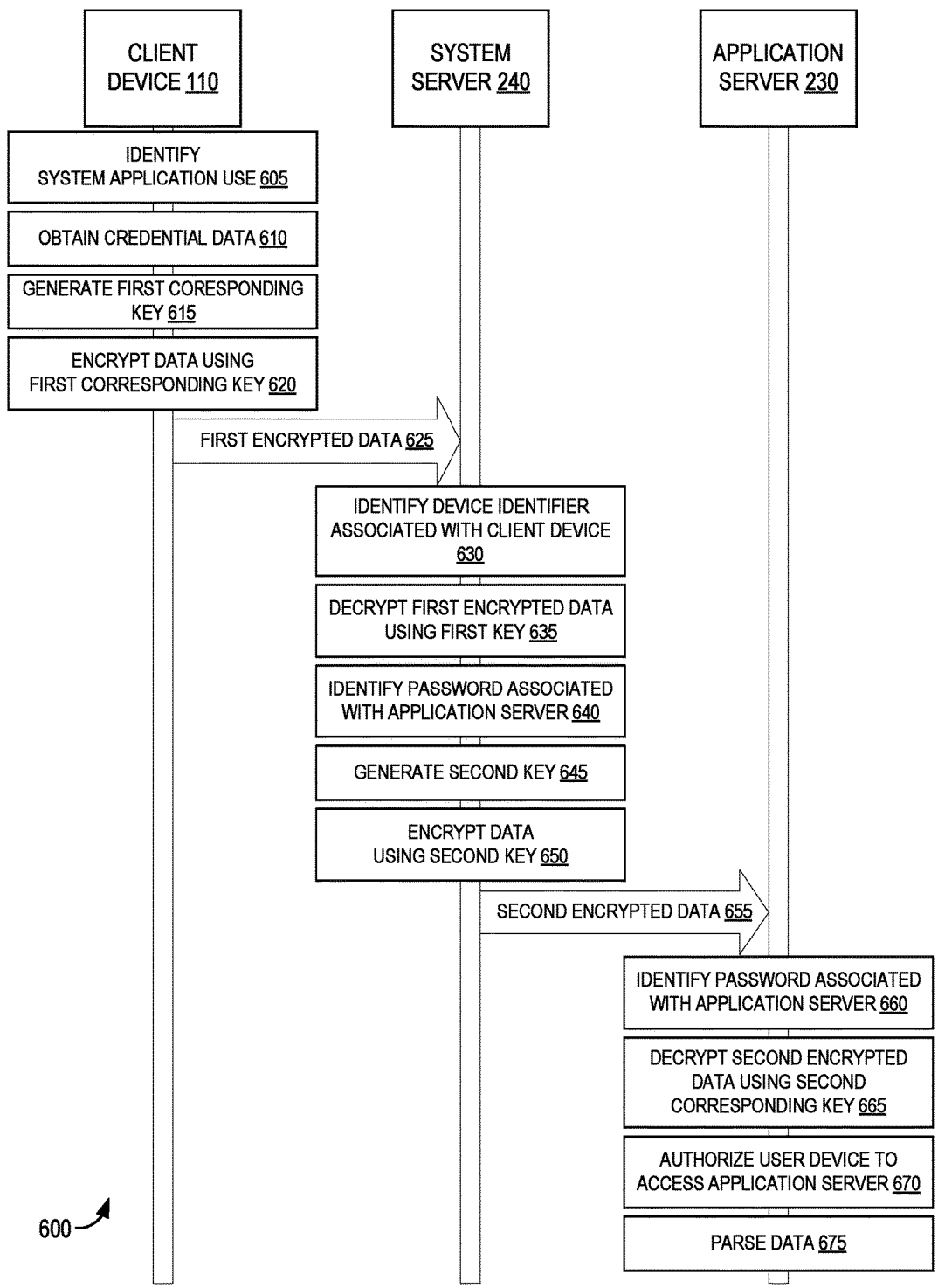
FIG. 6 is a sequence diagram for providing authentication services in an environment, such as the environment shown in FIG. 2.

FIG. 6 is a sequence diagram 600 for providing authentication services in the environment 100. In some embodiments, a use of a system application 210 (e.g., a first application) at a client device 110 is identified at 605, and system credential data 310 is obtained at 610 to determine whether continued use of the system application 210 at the client device 110 is allowed. A first corresponding key is generated at 615 and used to encrypt data (e.g., the system credential data 310) at 620. The first corresponding key may be associated, for example, with identifier data 250 (e.g., a device identifier) associated with the client device 110.

First encrypted data (e.g., data 242) is transmitted from the client device 110 and received at the system server 240 at 625. In some embodiments, the first encrypted data is analyzed to identify a device identifier associated with the client device 110 at 630. The device identifier may be used to generate a first key 270, and the first key 270 may be used to decrypt the first encrypted data at 635. If the system credential data 310 corresponds to first credential data 320 stored at the system server 240, the client device 110 may be identified as being authorized to access the vault system 130. The first credential data 320 may include, for example, one or more device identifiers associated with one or more registered client devices 110.

Second credential data 330 associated with the first credential data 320 is identified at 640. For example, the first encrypted data may be analyzed to identify an application service, an application server 230 associated with the application service, and/or a password for accessing or using the application server 230. Second credential data 330 may include, for example, one or more passwords associated with one or more application servers 230 for communicatively coupling a registered client device 110 to the application servers 230 (e.g., via the system server 240). In some embodiments, the identified passwords are used to generate one or more second keys 280 at 645, and the second keys 280 are used to encrypt data at 650.

Second encrypted data (e.g., data 244) is transmitted from the system server 240 and received at the application servers 230 at 655. In some embodiments, the second encrypted data is analyzed to identify the second key 280 and/or a password associated with the application server 230 at 660. The second key 280 and/or the password may be used to generate a second corresponding key, and the second corresponding key may be used to decrypt the second encrypted data at 665. The application server 230 parses the data at 675 to determine whether the second encrypted data is successfully decrypted using the second corresponding key. If the second encrypted data is not successfully decrypted, the application server 230 may determine that the password used to generate the second key 280 does not correspond with a registered password (e.g., application credential data 340) and, accordingly, identify that the client device 110 is not authorized to access the application server 230 (e.g., via the server system 240). If, on the other hand, the second encrypted data is successfully decrypted, the application server 230 may identify that the client device 110 is authorized to access the application server 230 (e.g., via the server system 240) at 670.

Figure 7:
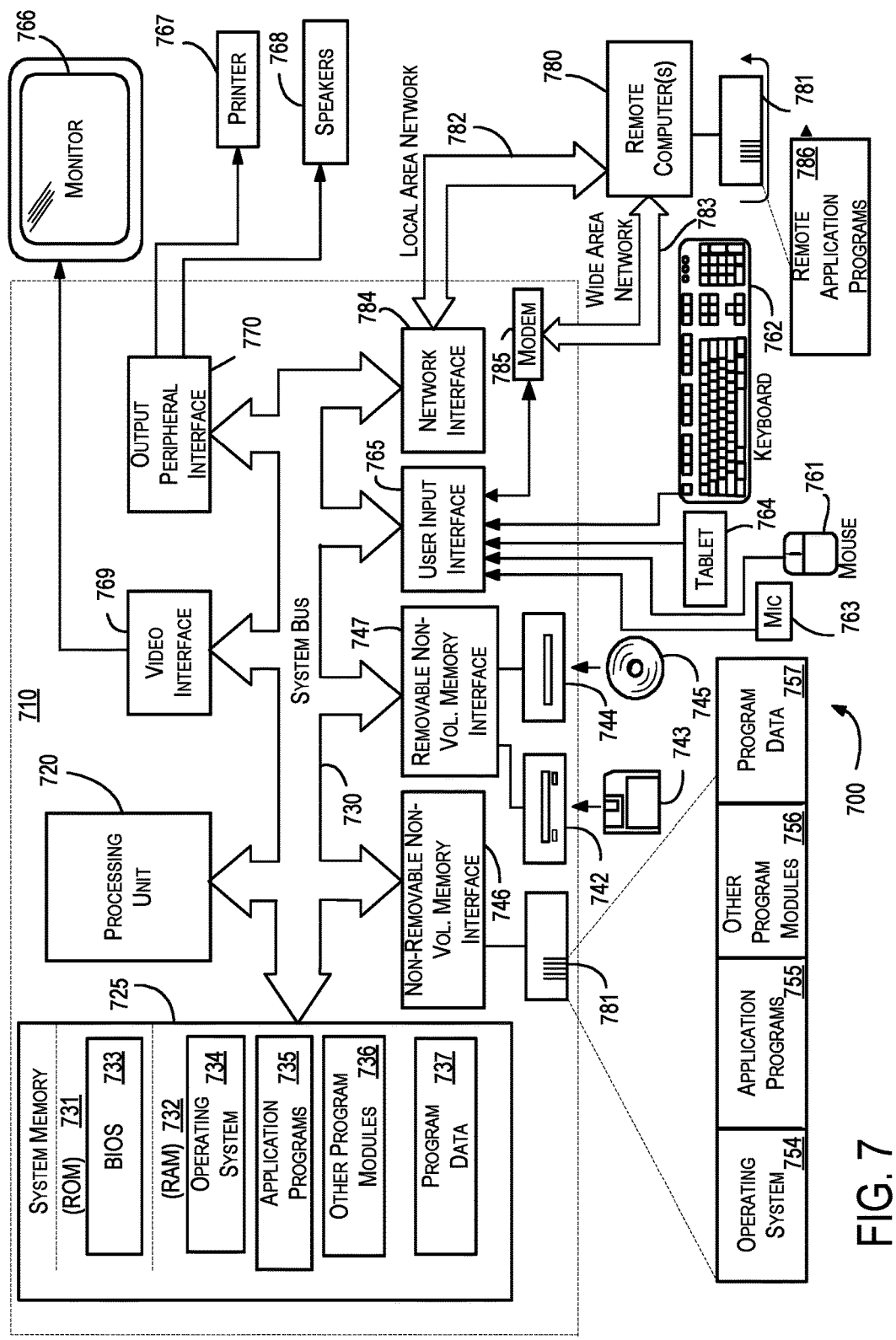
FIG. 7 is a block diagram illustrating an example operating environment for providing authentication services.

FIG. 7 is a block diagram illustrating an example operating environment 700 that may be used to provide authentication services. The operating environment 700 is only one example of a computing and networking environment and is not intended to suggest any limitation as to the scope of use or functionality of the disclosure. The operating environment 700 should not be interpreted as having any dependency or requirement relating to any one or combination of components illustrated in the example operating environment 700.

The disclosure is operational with numerous other computing and networking environments or configurations. While some examples of the disclosure are illustrated and described herein with reference to the operating environment 700 being or including a system server 240 (shown, e.g., in FIG. 2) or a computing device 400 (shown in FIG. 4), aspects of the disclosure are operable with any computing device (e.g., client device 110, vault system 130, application server 230) that executes instructions to implement the operations and functionality associated with the operating environment 700.

For example, the operating environment 700 may include a mobile device, a smart watch or device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 700 may represent a group of processing units or other computing devices. Additionally, any computing device described herein may be configured to perform any operation described herein including one or more operations described herein as being performed by another computing device.

With reference to FIG. 7, an example system for implementing various aspects of the disclosure may include a general purpose computing device in the form of a computer 710. Components of the computer 710 may include, but are not limited to, a processing unit 720 (e.g., a processor), a system memory 725 (e.g., a computer-readable storage device), and a system bus 730 that couples various system components including the system memory 725 to the processing unit 720. The system bus 730 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 725 includes any quantity of media associated with or accessible by the processing unit 720. For example, the system memory 725 may include computer storage media in the form of volatile and/or nonvolatile memory, such as read only memory (ROM) 731 and random access memory (RAM) 732. The ROM 731 may store a basic input/output system 733 (BIOS) that facilitates transferring information between elements within computer 710, such as during start-up. The RAM 732 may contain data and/or program modules that are immediately accessible to and/or presently being operated on by processing unit 720. For example, the system memory 725 may store computer-executable instructions, application data 140, account data 150, identifier data 250, credential data 260 (e.g., system credential data 310, first credential data 320, second credential data 330, application credential data 340), and/or encryption data (e.g., first key 270, second key 280), and other data.

The processing unit 720 may be programmed to execute the computer-executable instructions for implementing aspects of the disclosure, such as those illustrated in the figures (e.g., FIGS. 5 and 6). For example, the system memory 725 may include an interface component 410 (shown in FIG. 4), a map component 420 (shown in FIG. 4), a client component 430 (shown in FIG. 4), an application component 440 (shown in FIG. 4), and/or an encryption component 450 (shown in FIG. 4) for implementing aspects of the disclosure. The processing unit 720 includes any quantity of processing units, and the instructions may be performed by the processing unit 720 or by multiple processors within the operating environment 700 or performed by a processor external to the operating environment 700. By way of example, and not limitation, FIG. 7 illustrates operating system 734, application programs 735, other program modules 736, and program data 737.

Upon programming or execution of these components, the operating environment 700 and/or processing unit 720 is transformed into a special purpose microprocessor or machine. For example, the map component 420, when executed by the processing unit 720, causes the computer 710 to obtain a request to register the user device, and process the request such that the device identifier is mapped to the client device 110 and/or the password is mapped to the application server 230; the client component 430, when executed by the processing unit 720, causes the computer 710 to obtain first encrypted data associated with an application service; the application component 440, when executed by the processing unit 720, causes the computer 710 to identify the application server 230 associated with the application service, and transmit second encrypted data to the application server 230; and/or the encryption component 450, when executed by the processing unit 720, causes the computer 710 to generate a first key 270 based on a device identifier corresponding to the client device 110, use the first key 270 to decrypt the first encrypted data, generate a second key 280 based on a password associated with an application server 230, and use the second key 280 to generate the second encrypted data associated with the application service. Although the processing unit 720 is shown separate from the system memory 725, embodiments of the disclosure contemplate that the system memory 725 may be onboard the processing unit 720 such as in some embedded systems.

The computer 710 includes a variety of computer-readable media. Computer-readable media may be any available media that may be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 731 and RAM 732 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 710. Computer storage media are implemented in hardware and exclude carrier waves and propagated signals. Any such computer storage media may be part of computer 710.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user (e.g., user 102) may enter commands and information into the computer 710 through one or more input devices, such as a pointing device 761 (e.g., mouse, trackball, touch pad), a keyboard 762, a microphone 763, and/or an electronic digitizer 764 (e.g., tablet). Other input devices not shown in FIG. 7 may include a joystick, a game pad, a controller, a satellite dish, a camera, a scanner, an accelerometer, or the like. These and other input devices may be coupled to the processing unit 720 through a user input interface 765 that is coupled to the system bus 730, but may be connected by other interface and bus structures, such as a parallel port, game port or a universal serial bus (USB).

Information, such as text, images, audio, video, graphics, alerts, and the like, may be presented to a user via one or more presentation devices, such as a monitor 766, a printer 767, and/or a speaker 768. Other presentation devices not shown in FIG. 7 may include a projector, a vibrating component, or the like. These and other presentation devices may be coupled to the processing unit 720 through a video interface 769 (e.g., for a monitor 766 or a projector) and/or an output peripheral interface 770 (e.g., for a printer 767, a speaker 768, and/or a vibration component) that are coupled to the system bus 730, but may be connected by other interface and bus structures, such as a parallel port, game port or a USB. In some embodiments, the presentation device is integrated with an input device configured to receive information from the user (e.g., a capacitive touch-screen panel, a controller including a vibrating component). Note that the monitor 766 and/or touch screen panel may be physically coupled to a housing in which the computer 710 is incorporated, such as in a tablet-type personal computer.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 782 and one or more wide area networks (WAN) 783, but may also include other networks. Such networking environments are commonplace in offices, enterprise-wide computer networks, intranets and the Internet.

When used in a LAN networking environment, the computer 710 is coupled to the LAN 782 through a network interface or adapter 784. When used in a WAN networking environment, the computer 710 may include a modem 785 or other means for establishing communications over the WAN 783, such as the Internet. The modem 785, which may be internal or external, may be connected to the system bus 730 via the user input interface 765 or other appropriate mechanism. A wireless networking component including an interface and antenna may be coupled through a device, such as an access point or peer computer to a LAN 782 or WAN 783. In a networked environment, program modules depicted relative to the computer 710, or portions thereof, may be stored in the remote memory storage device. By way of example, and not limitation, FIG. 7 illustrates remote application programs 786 as residing on memory storage device 781. It may be appreciated that the network connections shown are examples and other means of establishing a communications link between the computers may be used.

The block diagram of FIG. 7 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 7 may be performed by other elements in FIG. 7, or an entity (e.g., processor, web service, server, applications, computing device, etc.) not shown in FIG. 7.

Figure 8:
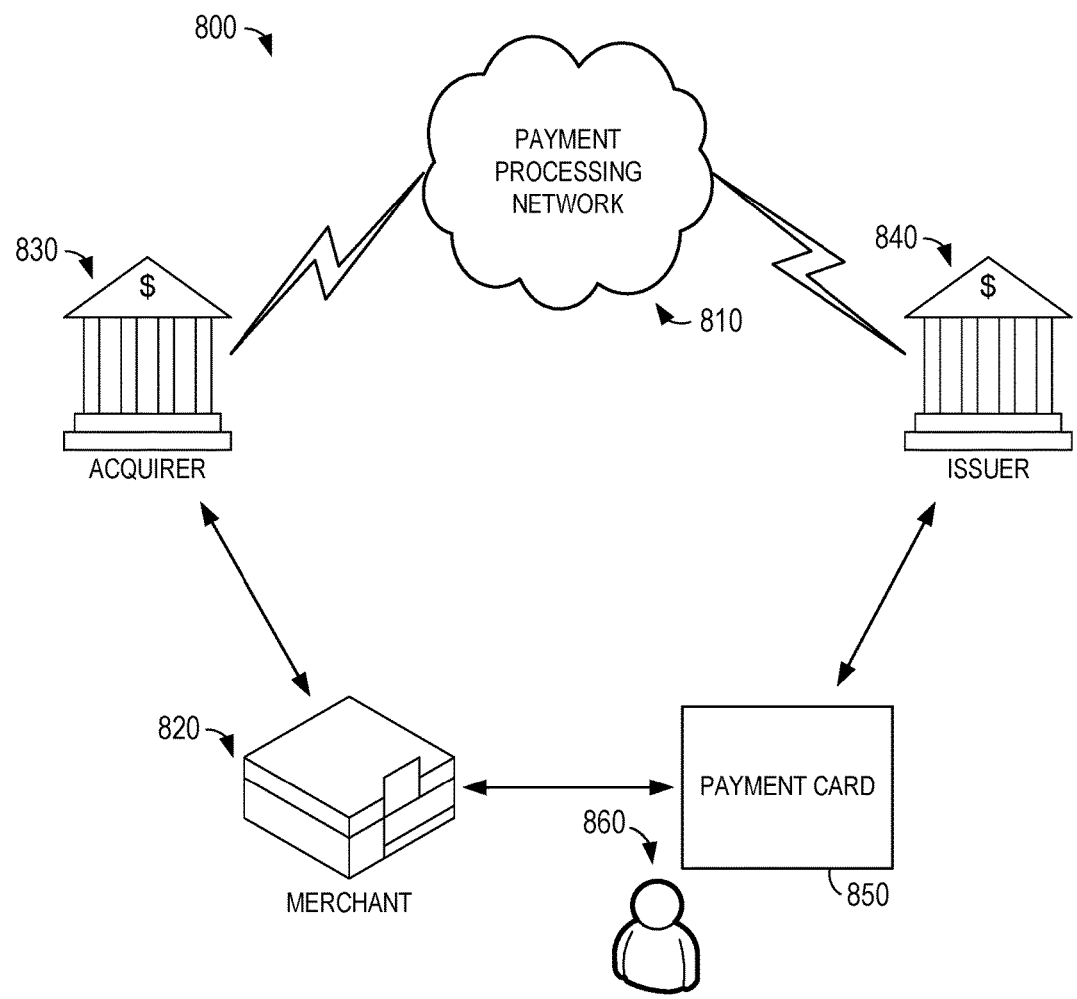
FIG. 8 is a block diagram illustrating an example environment for processing financial transactions.

FIG. 8 is a block diagram illustrating an example environment 800 for processing one or more financial transactions. The environment 800 includes a processing network 810, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 800 includes one or more merchants 820 that accept payment via the processing network 810. For example, payment may be accepted at the client device 110 or a merchant device. To accept payment via the processing network 810, the merchant 820 establishes a financial account with an acquirer 830 that is a member of the processing network 810. The acquirer 830 is a financial institution that maintains a relationship with one or more merchants 820 to enable the merchants 820 to accept payment via the processing network 810. The acquirer 830 may also be known as an acquiring bank, a processing bank, or a merchant bank.

The environment 800 includes one or more issuers 840 that issue or provide payment cards 850 (e.g., credit card, debit card, prepaid card, and the like) or other payment products to one or more cardholders 860 (e.g., user 102) or, more broadly, account holders ("cardholder" and "account holder" may be used interchangeably herein). The issuer 840 is a financial institution that maintains a relationship with one or more cardholders 860 to enable the cardholders 860 to make a payment using the payment card 850 via the processing network 810.

A cardholder 860 uses a payment product, such as a payment card 850, to purchase a good or service from a merchant 820. In some embodiments, the payment card 850 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 850 to purchase a good or service from a merchant 820. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 860 may use any payment product that is linked or associated with a corresponding financial account maintained by an issuer 840. As described herein, the term "payment card" includes credit cards, debit cards, prepaid cards, digital cards, smart cards, and any other payment product that is linked or associated with a corresponding financial account maintained by an issuer 840. Payment cards 850 may have any shape, size, or configuration that enables the environment 800 to function as described herein.

A cardholder 860 may present the merchant 820 with a payment card 850 to make a payment to the merchant 820 in exchange for a good or service. Alternatively, the cardholder 860 may provide the merchant 820 with account information associated with the payment card 850 without physically presenting the payment card 850 (e.g., for remote financial transactions including e-commerce transactions, card-not-present transactions, or card-on-file transactions). Account information may include a name of the cardholder 860, an account number, an expiration date, and/or a security code (such as a card verification value (CVV), a card verification code (CVC), and the like).

The merchant 820 requests authorization from an acquirer 830 for at least the amount of the purchase. The merchant 820 may request authorization using any financial transaction computing device configured to transmit account information of the cardholder 860 to one or more financial transaction processing computing devices of the acquirer 830. For example, the merchant 820 may request authorization through a point-of-sale (POS) terminal, which reads account information of the cardholder 860 from a microchip or magnetic stripe on the payment card 850, and transmits the cardholder's account information to the one or more financial transaction processing computing devices of the acquirer 830. For another example, the POS terminal reads account information of the cardholder 860 from a device configured to communicate with the POS terminal using contactless payment technology, and transmits the cardholder's account information to one or more financial transaction processing computing devices of the acquirer 830.

Using the processing network 810, the financial transaction processing computing devices of the acquirer 830 communicate with one or more financial transaction processing computing devices of an issuer 840 to determine whether the account information of the cardholder 860 matches or corresponds to the account information of the issuer 840, whether the account is in good standing, and/or whether the purchase is covered by (e.g., less than) a credit line or account balance associated with the financial account. Based on these determinations, the financial transaction processing computing devices of the issuer 840 determine whether to approve or decline the request for authorization from the merchant 820.

If the request for authorization is declined, the merchant 820 is notified as such, and may request authorization from the acquirer 830 for a lesser amount or request an alternative form of payment from the cardholder 860. If the request for authorization is approved, an authorization code is issued to the merchant 820, and the cardholder's available credit line or account balance is decreased. The financial transaction is then settled between the merchant 820, the acquirer 830, the issuer 840, and/or the cardholder 860. Settlement typically includes the acquirer 830 reimbursing the merchant 820 for selling the good or service, and the issuer 840 reimbursing the acquirer 830 for reimbursing the merchant 820. When a credit card is used, the issuer 840 may bill the cardholder 860 to settle a financial account associated with the cardholder 860. When a debit or prepaid card is used, the issuer 840 may automatically withdraw funds from the account.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for providing authentication services. For example, the elements illustrated in FIGS. 1-4 and 6-8, such as when encoded to perform the operations illustrated in FIGS. 5 and 6, constitute at least an example means for receiving data associated with an application service (e.g., interface component 410, client component 430); an example means for decrypting data associated with the application service using a first key 270 associated with a device identifier that corresponds to the client device 110 (e.g., encryption component 450); an example means for encrypting the data associated with the application service using a second key 280 associated with a password stored at the system server 240 (e.g., encryption component 450); and/or an example means for transmitting the data associated with the application service (e.g., interface component 410, application component 440).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A system for providing single sign-on services between a user device and a plurality of application servers providing application services, the system comprising:
   a system server coupled to a plurality of application servers, the plurality of application servers providing application services to a user, the system server operating to:
      register a user device associated with a user based on receiving one or more passwords from the user device for accessing application services provided by the plurality of application servers;
      receive, from the user device, a request to access one of the plurality of application servers, the received request including data encrypted at the user device using a first corresponding key of a first key pair, the first key pair being generated by the system server based on a key threshold allowing the first key pair to be updated systematically or periodically or both, the first corresponding key associated with identifier data associated with the user device;
      analyze the received request to identify the user device and a first key of the first key pair for decrypting the encrypted data, the first key being associated with the user device, and a password stored at the system server, the password being previously provided by the user for accessing the one of the plurality of application servers;
      decrypt the encrypted data using the first key;
      generate a second key using the password;
      encrypt the decrypted data using the second key; and
      transmit, to the one of the plurality of application servers, the data encrypted using the second key for the one of the plurality of application servers to provide at least one of the application services to the user based on the transmitted data by identifying the second key and identifying a second corresponding key based on the identified second key and decrypting the transmitted data using the identified second corresponding key.

2. The system of claim 1, wherein the system server further operates to:
   receive a request to register the user device; and
   map one or more of a device identifier to the user device or one or more passwords to the plurality of application servers.

3. The system of claim 1, wherein one or more passwords are stored on the system server and the system server selects a password of the one or more passwords, based on the received request.

4. The system of claim 1, wherein the system server further operates to:
   transmit, to the user device, the first key pair.

5. The system of claim 1, wherein account data is used to authenticate the user.

6. The system of claim 1, wherein the system server further operates to:
   receive, from the user device, a request to access the one of the plurality of application servers; and
   determine whether the user device is authorized to access the one of the plurality of application servers.

7. The system of claim 1, wherein the system server further operates to:
   generate a key generator for generating a key pair including one of the first key or the second key; and
   transmit the key generator to the user device or one or more application servers of the plurality of the application servers.

8. The system of claim 1, wherein the system server has access to account data and stores the account data to at least authenticate the user device.

9. The system of claim 1, wherein the system server further operates to:
   receive, from the user device, a request to access one of the plurality of application servers; and
   determine if the user device is authorized to access the one of the plurality of application servers.

10. The system of claim 1, wherein the system server further operates to analyze the received data destined for the at least one of the application services to identify, from the plurality of application servers, the one of the plurality of application servers.

11. The system of claim 1, wherein the one of the plurality of application servers further receives, from the system server, the transmitted data associated with the at least one of the application services; and uses a second corresponding key to decrypt the transmitted data to provide the application services.

12. The system of claim 1, wherein registering the user device for accessing application services provided by the plurality of application servers comprises registering the user device for the application services provided by the plurality of application servers for preapproved applications associated with the user device.

13. The system of claim 1, wherein the one of the plurality of application servers further determines whether the user device or the system server or both are authorized to access the one of the plurality of application servers.

14. One or more computer storage media embodied with instructions executable by one or more processors for providing single sign-on services between a user device and a plurality of application servers providing application services, that when executed by the one or more processors perform operations comprising:

registering, by a system server, a user device associated with a user based on receiving one or more passwords from the user device for accessing application services provided by the plurality of application servers;

receiving, from the user device, a request to access one of the plurality of application servers, the received request including data encrypted at the user device using a first corresponding key of a first key pair, the first key pair being generated by the system server based on a key threshold allowing the first key pair to be updated systematically or periodically or both, the first corresponding key associated with identifier data associated with the user device;

analyzing the received request to identify the user device and a first key of the first key pair for decrypting the encrypted data, the first key being associated with the user device, and a password stored at the system server, the password being previously provided by the user for accessing the one of the plurality of application servers;

decrypting the encrypted data using the first key;

generating a second key using the password;

encrypting the decrypted data using the second key; and transmitting, to the one of the plurality of application servers, the data encrypted using the second key for the one of the plurality of application servers to provide at least one of the application services to the user based on the transmitted data by identifying the second key and identifying a second corresponding key based on the identified second key and decrypting the transmitted data using the identified second corresponding key.

15. The one or more computer storage media of claim 14, wherein the instructions executed by the one or more processors perform further operations comprising obtaining a request to register the user device, and processing the request such that the device identifier is mapped to the user device.

16. The one or more computer storage media of claim 14, wherein account data is used to authenticate the user.

17. A computer-implemented method for providing single sign-on services between a user device and a plurality of application servers providing application services, the computer-implemented method comprising:

registering, by a system server, a user device associated with a user based on receiving one or more passwords from the user device for accessing application services provided by the plurality of application servers;

receiving, from the user device, a request to access one of the plurality of application servers, the received request including data encrypted at the user device using a first corresponding key of a first key pair, the first key pair being generated by the system server based on a key threshold allowing the first key pair to be updated systematically or periodically or both, the first corresponding key associated with identifier data associated with the user device;

analyzing the received request to identify the user device and a first key of the first key pair for decrypting the encrypted data, the first key being associated with the user device, and a password stored at the system server, the password being previously provided by the user for accessing the one of the plurality of application servers;

decrypting the encrypted data using the first key;

generating a second key using the password;

encrypting the decrypted data using the second key; and transmitting, to the one of the plurality of application servers, the data encrypted using the second key for the one of the plurality of application servers to provide at least one of the application services to the user based on the transmitted data by identifying the second key and identifying a second corresponding key based on the identified second key and decrypting the transmitted data using the identified second corresponding key.

18. The computer-implemented method of claim 17 wherein the first key is generated based on a first key threshold being satisfied.

19. The computer-implemented method of claim 17 further comprising:

transmitting, to the user device, the first key pair.

20. The computer-implemented method of claim 17, wherein the system server communicates with the one of the plurality of application servers which is associated with a set of preapproved applications associated with the user device.

* * * * *